United States Patent
Chen et al.

(10) Patent No.: US 10,222,670 B2
(45) Date of Patent: Mar. 5, 2019

(54) LIQUID CRYSTAL DISPLAY DEVICE AND MANUFACTURE METHOD THEREOF

(71) Applicant: Shenzhen China Star Optoelectronics Technology Co., Ltd., Shenzhen (CN)

(72) Inventors: Xingwu Chen, Shenzhen (CN); Xiaolong Ma, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 177 days.

(21) Appl. No.: 15/115,684

(22) PCT Filed: May 13, 2016

(86) PCT No.: PCT/CN2016/081938
§ 371 (c)(1),
(2) Date: Jul. 31, 2016

(87) PCT Pub. No.: WO2017/177497
PCT Pub. Date: Oct. 19, 2017

(65) Prior Publication Data
US 2018/0107038 A1    Apr. 19, 2018

(30) Foreign Application Priority Data

Apr. 13, 2016    (CN) .......................... 2016 1 0228437

(51) Int. Cl.
*C09K 19/54*    (2006.01)
*G02F 1/1335*    (2006.01)
(Continued)

(52) U.S. Cl.
CPC .......... *G02F 1/1368* (2013.01); *C08F 122/20* (2013.01); *C09K 11/025* (2013.01);
(Continued)

(58) Field of Classification Search
CPC ............ G02F 1/1368; G02F 1/133528; G02F 2001/13793; C08F 122/20; C09K 11/025
(Continued)

(56) References Cited

U.S. PATENT DOCUMENTS

2008/0206493 A1*  8/2008  Shimoda .............. C09K 19/542
                                                         428/1.6
2010/0079700 A1*  4/2010  Hasegawa ......... G02F 1/133528
                                                          349/62
(Continued)

FOREIGN PATENT DOCUMENTS

CN    101900913 A    12/2010
CN    103215050 A    7/2013

OTHER PUBLICATIONS

Google patents translation of CN 107255840A.*

*Primary Examiner* — Lucy P Chien
(74) *Attorney, Agent, or Firm* — Leong C. Lei

(57) ABSTRACT

Provided are a liquid crystal display device and a manufacture method thereof. The liquid crystal display device is a blue phase liquid crystal display device. The alignment layer is not required. The liquid crystal composition forming the liquid crystal layer comprises liquid crystal material, quantum dots material mixed in the liquid crystal material, polymeric monomer and chiral material; the polymeric monomer is polymerized to form a polymer network under a blue phase temperature range as forming the liquid crystal layer, which can stabilize the blue phase liquid crystal, and thus to expand the blue phase temperature range. The grain size of the quantum dots material in the liquid crystal composition is in the nano scale, which can expand the blue phase liquid crystal temperature range. Namely, the blue phase temperature range of the liquid crystal material has already been expanded before the polymeric monomer is polymerized.

13 Claims, 4 Drawing Sheets

(51) Int. Cl.
    *C08F 122/20*     (2006.01)
    *G02F 1/1339*     (2006.01)
    *G02F 1/1368*     (2006.01)
    *G02B 27/22*     (2018.01)
    *C09K 11/02*     (2006.01)
    *C09K 19/02*     (2006.01)
    *C09K 19/58*     (2006.01)
    *C09K 19/52*     (2006.01)
    *C09K 19/04*     (2006.01)
    *C09K 19/30*     (2006.01)
    *G02F 1/137*     (2006.01)

(52) U.S. Cl.
    CPC ........ *C09K 19/0275* (2013.01); *C09K 19/542* (2013.01); *C09K 19/586* (2013.01); *G02B 27/22* (2013.01); *G02F 1/133512* (2013.01); *G02F 1/133528* (2013.01); *G02F 1/133617* (2013.01); *G02F 1/133621* (2013.01); *C09K 2019/0448* (2013.01); *C09K 2019/301* (2013.01); *C09K 2019/3004* (2013.01); *C09K 2019/3009* (2013.01); *C09K 2019/521* (2013.01); *C09K 2019/546* (2013.01); *G02F 1/13394* (2013.01); *G02F 1/133514* (2013.01); *G02F 2001/13793* (2013.01); *G02F 2001/133614* (2013.01); *G02F 2202/022* (2013.01); *G02F 2202/36* (2013.01)

(58) Field of Classification Search
    USPC .......................................................... 349/163
    See application file for complete search history.

(56) References Cited

U.S. PATENT DOCUMENTS

| | | | |
|---|---|---|---|
| 2010/0208172 A1* | 8/2010 | Jang | B82Y 20/00 349/71 |
| 2010/0252827 A1* | 10/2010 | Asano | H01L 29/78618 257/43 |
| 2010/0302492 A1* | 12/2010 | Kubota | G02F 1/134363 349/138 |
| 2013/0021546 A1* | 1/2013 | Kikuchi | C09K 19/32 349/33 |
| 2014/0327862 A1* | 11/2014 | Hatsusaka | C09K 19/0225 349/100 |

* cited by examiner

LIQUID CRYSTAL DISPLAY DEVICE AND MANUFACTURE METHOD THEREOF

FIELD OF THE INVENTION

The present invention relates to a liquid crystal display technology field, and more particularly to a liquid crystal display device and a manufacture method thereof.

BACKGROUND OF THE INVENTION

The Liquid Crystal Display (LCD) is one of the most widely utilized flat panel displays, and the liquid crystal display panel is the core component of the Liquid Crystal Display.

The traditional liquid crystal display panel generally comprises a Color Filter (CF), a Thin Film Transistor Array Substrate (TFT Array Substrate) and a Liquid Crystal Layer positioned inbetween. The working principle is that the liquid crystal molecules are positioned between the two parallel glass substrates, and many vertical and horizontal tiny little electrical lines are between the two glass substrates, and the light of backlight module is reflected to generate images by applying driving voltages or not for controlling the direction changes of the liquid crystal molecules. The thin film transistor (TFT) array manufactured on the thin film transistor array substrate is employed to drive the liquid crystal to rotate to control the display of each pixel. The color filter substrate comprises RGB color filter layers, which is employed for forming colors of each pixel.

Quantumdots (QDs) light emitting material is a new technology applied in the liquid crystal display technology field. The Quantumdots comprises nano particles of which the grain sizes are between 1-20 nm. Because the electron and hole are in the quantum confinement, and the continuous energy band structure becomes the discrete energy level structure with molecule property, which can irradiate fluorescent light after being excited. The generated spectrum of the quantum dots is mainly controlled according to the grain sizes of the quantum dots. The regulation of the emission spectrum can be achieved by changing the grain sizes of the quantum dots, and the white light is formed by the combination of the quantum dots of various grain sizes with a certain ratio. The Quantumdots light emitting material possesses advantages of luminescence spectrum concentration and high color purity. Meanwhile, the light conversion efficiency of the quantum dots material is very high and can raise the light efficiency.

The Blue phase (BP) is the phase state with special properties in the liquid crystal phase change process appearing among nematic and isotropic phases. The blue phase liquid crystal has the unique twisted spiral arrangement structure, and has advantages of fast response, and the response time can be smaller than 1 ms, which can be applied in the field sequential display and the 3D display. Meanwhile, because the blue phase liquid crystal is the isotropic structure and can generate optical birefringence with the applied electrical power. The liquid crystal display applied with the blue phase liquid crystal does not need to manufacture the alignment layer, and can reduce the process difficulty to decrease the cost. However, there is the issue that the temperature range is narrow (1-2° C.), and the driving voltage is high, and it is difficult to recovery to the initial state after the electrical power is applied, i.e. the hysteresis for the blue phase liquid crystal. IT is hard to be utilized in the practical application.

In prior art, for expanding the temperature range of the blue phase liquid crystal, the method of stabling the blue phase liquid crystal with polymer can be used for expanding the temperature range of the blue phase liquid crystal. The method needs to add polymeric monomer in the liquid crystal. When the liquid crystal is heated to the blue phase temperature range, the ultraviolet irradiation is implemented to the polymeric monomer, which can significantly expand the temperature range of the blue phase. The method has high requirement for the temperature precision. As in the polymerization, the temperature needs to be controlled within ±1° C. or the temperature range which is even smaller, and the process difficulty is very high; another method of expanding the blue phase liquid crystal temperature range is to add the nano particles of certain ratio in the blue phase liquid crystal, and the temperature range of the blue phase can be controlled within a certain degree.

SUMMARY OF THE INVENTION

An objective of the present invention is to provides a liquid crystal display device, which is a blue phase liquid crystal display device without the alignment layers, and the manufacture cost is low, and the response is fast, and the backlight efficiency is high, and the display color gamut is high, which can be applied for the rapid display and 3D display fields.

Another objective of the present invention is to provide a manufacture method of a liquid crystal display device, which reduce the manufacture cost, and promote the response speed, the backlight efficiency and the display color gamut of the liquid crystal display device.

For realizing the aforesaid objectives, the present invention first provides a liquid crystal display device, comprising a liquid crystal display panel and a backlight module under the liquid crystal display panel;

the liquid crystal display panel comprises a TFT array substrate and a color filter substrate which are oppositely located, and a liquid crystal layer sandwiched between the TFT array substrate and the color filter substrate, a lower polarizer located at one side of the TFT array substrate away from the liquid crystal layer and an upper polarizer located at one side of the color filter substrate away from the liquid crystal layer;

the liquid crystal layer is formed with a liquid crystal composition, and the liquid crystal composition comprises liquid crystal material, quantum dots material mixed in the liquid crystal material, polymeric monomer and chiral material;

the liquid crystal material in the liquid crystal layer is blue phase liquid crystal;

the polymeric monomer is polymerized to form a polymer network under a blue phase temperature range of the liquid crystal material as forming the liquid crystal layer.

A mass percentage of the polymeric monomer in the liquid crystal composition is 0.1 wt %-25 wt %.

The quantum dots material in the liquid crystal composition comprises: red photoluminescence quantum dots, green photoluminescence quantum dots and blue photoluminescence quantum dots;

a mass percentage of the red photoluminescence quantum dots in the liquid crystal composition is 0.01 wt %-2 wt %; a mass percentage of the green photoluminescence quantum dots in the liquid crystal composition is 0.01 wt %-2 wt % and a mass percentage of the blue photoluminescence quantum dots in the liquid crystal composition is smaller 2 wt %.

quantum dots material in the liquid crystal composition is quantum dots of which surfaces have been modified and provided with ligand molecules, and material of the quantum dots is one or more of CdS, CSe, CTe, PbS, PbSe, PbTe, ZnS, ZnSe, ZnTe, HgS, HgSe, HgTe, GaS, GaSe, Gae, InS, InSe and InTe, and sizes of the quantum dots are 1-30 nm.

The TFT array substrate comprises: a first substrate, a TFT array located on the first substrate and an electrode layer located on the TFT array;

the color filter substrate comprises: a second substrate, a black matrix located on the second substrate, a color filter layer located on the second substrate and the black matrix and photo spacers located on the color filter layer;

the backlight module is a blue light backlight module.

The present invention further provides a manufacture method of a liquid crystal display device, comprising steps of:

step 1, providing a TFT array substrate and a color filter substrate;

step 2, providing a liquid crystal composition, and the liquid crystal composition is dropped on the TFT array substrate or the color filter substrate;

the liquid crystal composition comprises liquid crystal material, quantum dots material mixed in the liquid crystal material, polymeric monomer and chiral material;

then, the liquid crystal material in the liquid crystal composition is nematic liquid crystal;

step 3, oppositely assembling the TFT array substrate or the color filter substrate to obtain a cell;

step 4, heating the cell to a cleaning point of the liquid crystal material, and then cooling the same, and as the temperature is cooled to a blue phase temperature range of the liquid crystal material and is kept constant, and implementing ultraviolet irradiation to the cell from a side of the TFT array substrate to polymerize the polymeric monomer to form a polymer network and to obtain a liquid crystal layer sandwiched between the TFT array substrate and the color filter substrate, and then the liquid crystal material in the liquid crystal layer is blue phase liquid crystal;

step 5, laminating a lower polarizer at one side of the TFT array substrate away from the liquid crystal layer, and laminating an upper polarizer at one side of the color filter substrate away from the liquid crystal layer to obtain a liquid crystal display panel;

step 6, providing a backlight module, and assembling the liquid crystal display panel and the backlight module to accomplish manufacture of the liquid crystal display device.

The quantum dots material in the liquid crystal composition provided in the step 2 comprises: red photoluminescence quantum dots, green photoluminescence quantum dots and blue photoluminescence quantum dots;

a mass percentage of the red photoluminescence quantum dots in the liquid crystal composition is 0.01 wt %-2 wt %; a mass percentage of the green photoluminescence quantum dots in the liquid crystal composition is 0.01 wt %-2 wt % and a mass percentage of the blue photoluminescence quantum dots in the liquid crystal composition is smaller 2 wt %;

quantum dots material in the liquid crystal composition is quantum dots of which surfaces have been modified and provided with ligand molecules, and material of the quantum dots is one or more of CdS, CSe, CTe, PbS, PbSe, PbTe, ZnS, ZnSe, ZnTe, HgS, HgSe, HgTe, GaS, GaSe, Gae, InS, InSe and InTe, and sizes of the quantum dots are 1-30 nm.

A mass percentage of the polymeric monomer in the liquid crystal composition provided in the step 2 is 0.1 wt %-25 wt %.

In the step 4, a cooling rate to the cell is 0.01° C./min-2° C./min.

The TFT array substrate comprises: a first substrate, a TFT array located on the first substrate and an electrode layer located on the TFT array;

the color filter substrate comprises: a second substrate, a black matrix located on the second substrate, a color filter layer located on the second substrate and the black matrix and photo spacers located on the color filter layer;

the backlight module is a blue light backlight module.

The present invention further provides a liquid crystal display device, comprising a liquid crystal display panel and a backlight module under the liquid crystal display panel;

the liquid crystal display panel comprises a TFT array substrate and a color filter substrate which are oppositely located, and a liquid crystal layer sandwiched between the TFT array substrate and the color filter substrate, a lower polarizer located at one side of the TFT array substrate away from the liquid crystal layer and an upper polarizer located at one side of the color filter substrate away from the liquid crystal layer;

the liquid crystal layer is formed with a liquid crystal composition, and the liquid crystal composition comprises liquid crystal material, quantum dots material mixed in the liquid crystal material, polymeric monomer and chiral material;

the liquid crystal material in the liquid crystal layer is blue phase liquid crystal;

the polymeric monomer is polymerized to form a polymer network under a blue phase temperature range of the liquid crystal material as forming the liquid crystal layer;

wherein a mass percentage of the polymeric monomer in the liquid crystal composition is 0.1 wt %-25 wt %;

wherein the quantum dots material in the liquid crystal composition comprises: red photoluminescence quantum dots, green photoluminescence quantum dots and blue photoluminescence quantum dots;

a mass percentage of the red photoluminescence quantum dots in the liquid crystal composition is 0.01 wt %-2 wt %; a mass percentage of the green photoluminescence quantum dots in the liquid crystal composition is 0.01 wt %-2 wt % and a mass percentage of the blue photoluminescence quantum dots in the liquid crystal composition is smaller 2 wt %.

The benefits of the present invention are: the liquid crystal display device provided by the present invention is a blue phase liquid crystal display device. The alignment layer is not required. The liquid crystal composition forming the liquid crystal layer comprises liquid crystal material, quantum dots material mixed in the liquid crystal material, polymeric monomer and chiral material; the polymeric monomer is polymerized to form a polymer network under a blue phase temperature range of the liquid crystal material as forming the liquid crystal layer, which can stabilize the blue phase liquid crystal, and thus to expand the blue phase temperature range of the liquid crystal material. The grain size of the quantum dots material in the liquid crystal composition is in the nano scale, which can expand the blue phase liquid crystal temperature range. Namely, the blue phase temperature range of the liquid crystal material has already been expanded before the polymeric monomer is polymerized. Thus, the temperature precision requirement and the difficulty of the polymerization process is decreased, and the quantum dots material can improve the hysteresis, and meanwhile raise the backlight efficiency and the display color gamut of the liquid crystal display device, and the liquid crystal display device can be applied for the rapid display and 3D display fields. In the manufacture method of the liquid crystal display device, the liquid crystal composition forming the liquid crystal layer comprises liquid crystal material, quantum dots material mixed in the liquid crystal material, polymeric monomer and chiral material, and as the liquid crystal material is in the blue phase temperature range, the ultraviolet irradiation is implemented to the polymeric monomer to polymerize the same to form a polymer network, and thus to form the blue phase liquid crystal display device having wide temperature range, low hysteresis effect. The manufacture of the alignment layer in the liquid crystal display device can be eliminated to reduce the cost to raise the response speed of the liquid crystal display device and to raise the backlight efficiency and the display color gamut of the liquid crystal display device.

BRIEF DESCRIPTION OF THE DRAWINGS

In order to better understand the characteristics and technical aspect of the invention, please refer to the following detailed description of the present invention is concerned with the diagrams, however, provide reference to the accompanying drawings and description only and is not intended to be limiting of the invention.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
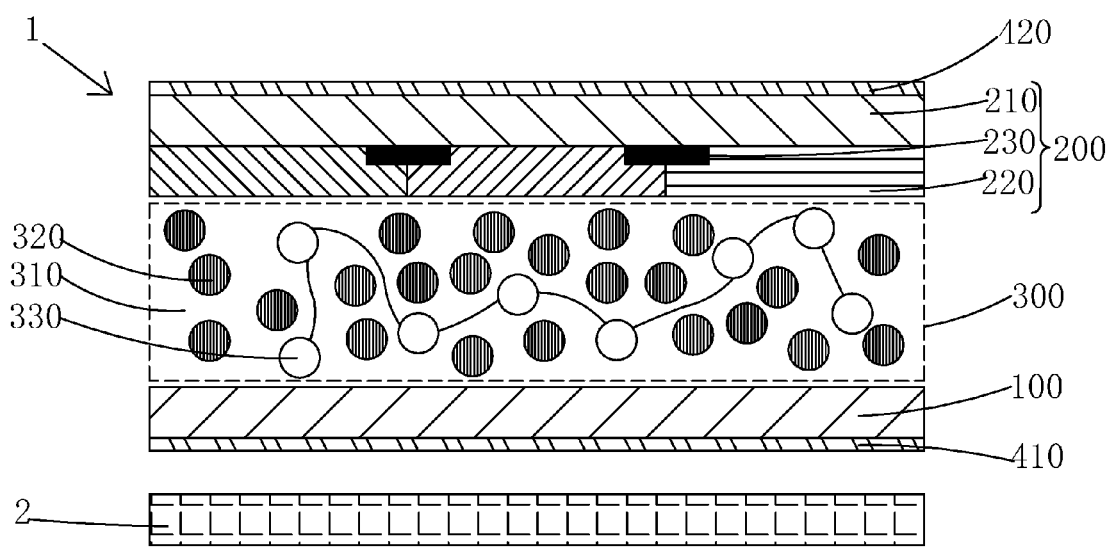
FIG. 1 is a structure diagram of a liquid crystal display device according to the present invention.

Please refer to FIG. 1. The present invention provides a liquid crystal display device, comprising a liquid crystal display panel 1 and a backlight module 2 under the liquid crystal display panel 1;

the liquid crystal display panel 1 comprises a TFT array substrate 100 and a color filter substrate 200 which are oppositely located, and a liquid crystal layer 300 sandwiched between the TFT array substrate 100 and the color filter substrate 200, a lower polarizer 410 located at one side of the TFT array substrate 100 away from the liquid crystal layer 300 and an upper polarizer 420 located at one side of the color filter substrate 200 away from the liquid crystal layer 300.

The TFT array substrate 100 comprises: a first substrate, a TFT array located on the first substrate and an electrode layer located on the TFT array; the color filter substrate 200 is employed to prevent the color mixture and the light leakage, and employed to form the color display and to provide the cell gap, and comprises: a second substrate 210, a black matrix 230 located on the second substrate, a color filter layer 220 located on the second substrate and the black matrix 230 and photo spacers located on the color filter layer 220.

The liquid crystal layer 300 is formed with a liquid crystal composition, and the liquid crystal composition comprises: liquid crystal material 310, quantum dots material 320 mixed in the liquid crystal material 310, polymeric monomer 330 and chiral material.

The liquid crystal material 310 in the liquid crystal layer 300 is blue phase liquid crystal.

The polymeric monomer 330 is polymerized to form a polymer network under a blue phase temperature range of the liquid crystal material 310 as forming the liquid crystal layer 300, which can stabilize the blue phase liquid crystal, and thus to expand the blue phase temperature range of the liquid crystal material 310.

Specifically, a mass percentage of the polymeric monomer 330 in the liquid crystal composition is 0.1 wt %-25 wt %.

Specifically, the liquid crystal material 310 in the liquid crystal layer 300 is manufactured with the nematic liquid crystal material 310, and the liquid crystal material 310 is positive liquid crystal.

Preferably, the molecule structure of the liquid crystal material 310 is one or more of followings:

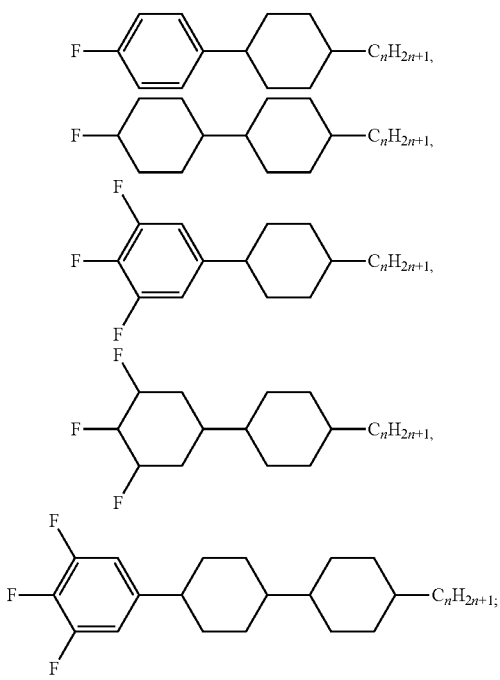

wherein n=3, 4, 5, 6, 7, 8.

Specifically, a mass percentage of the chiral material in the liquid crystal composition is 2 wt %-5 wt %.

Preferably, the molecule structure of the chiral material is

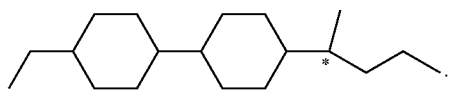 [SMILES: CCCC(C)C1CCC(C2CCC(CC)CC2)CC1]

Specifically, the polymeric monomer 330 is ultraviolet polymeric monomer having liquid crystal properties and the end group comprises the double bonds. Such ultraviolet polymeric monomer has the liquid crystal properties itself, and the end group comprises the double bonds, and can be better dissolved into the liquid crystal molecules.

Preferably, the polymeric monomer 330 is 1,4-Di[4-(6'-acryloyloxyhexyloxy)benzoyloxy]-2-methylbenzene, and the molecule structure is:

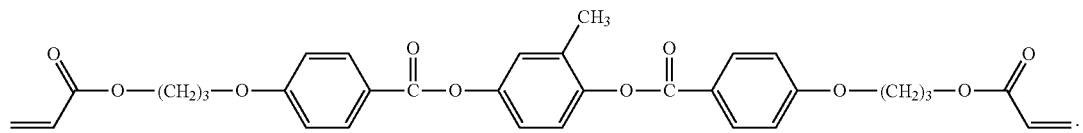

Specifically, the quantum dots material 320 in the liquid crystal composition comprises: red photoluminescence quantum dots, green photoluminescence quantum dots and blue photoluminescence quantum dots; a mass percentage of the red photoluminescence quantum dots in the liquid crystal composition is 0.01 wt %-2 wt %; a mass percentage of the green photoluminescence quantum dots in the liquid crystal composition is 0.01 wt % -2 wt % and a mass percentage of the blue photoluminescence quantum dots in the liquid crystal composition is smaller 2 wt %.

Specifically, the backlight module 2 is a blue light backlight module which emits the blue light; selectably, the quantum dots material 320 cannot include the blue photoluminescence quantum dots, either.

Moreover, the quantum dots material 320 in the liquid crystal composition is quantum dots of which surfaces have been modified and provided with ligand molecules. Specifically, the material of the quantum dots is one or more of CdS, CSe, CTe, PbS, PbSe, PbTe, ZnS, ZnSe, ZnTe, HgS, HgSe, HgTe, GaS, GaSe, Gae, InS, InSe and InTe, and comprises a core shell structure formed with the combination of the aforesaid arbitrary materials; the ligand molecules mainly are ligand with the liquid crystal group, and the quantum dots material 320, of which the surface is provided with ligand molecules, is lipophilic so that the quantum dots material 320 can be better dispersed in the blue phase liquid crystal 310. Specifically, the surface modification of the quantum dots material 320 can be microcapsulation, microemulsion, compounding and surfactant active solvent.

Specifically, the quantum dots material 320 in the liquid crystal composition is mixture having various particle grain sizes, and grain sizes of the quantum dots of forming the quantum dots material 320 are 1-30 nm.

Specifically, because the response time of the blue phase liquid crystal can be smaller than 1 ms, the response speed of the liquid crystal display device is promoted. Meanwhile, with the property of the blue phase liquid crystal, the alignment layer process is not required to be manufactured in the liquid crystal display device, which can reduce the difficulty of the process to reduce the production cost. As the liquid crystal material 310 is in the blue phase temperature range, the polymeric monomer 330 accepts the ultraviolet irradiation and generates polymerization to form a polymer network, and then it can stable the blue phase liquid crystal and expand the blue phase temperature range of the liquid crystal material 310 to reduce the application difficulty of the blue phase liquid crystal. The quantum dots material 320 is nano particle and can expand the blue phase temperature range of the liquid crystal material 310. Namely, the blue phase temperature range of the liquid crystal material 310 has already been expanded before the polymeric monomer 330 is polymerized. The difficulty of the polymerization process is decreased, and meanwhile, it can improve the hysteresis, and realize the zero hysteresis effect. Meanwhile, due to the property of the quantum dots material, the backlight efficiency and the display color gamut of the liquid crystal display device can be raised, and the performance of the liquid crystal display device is great and it can be applied for the rapid display and 3D display fields.

Figure 2:
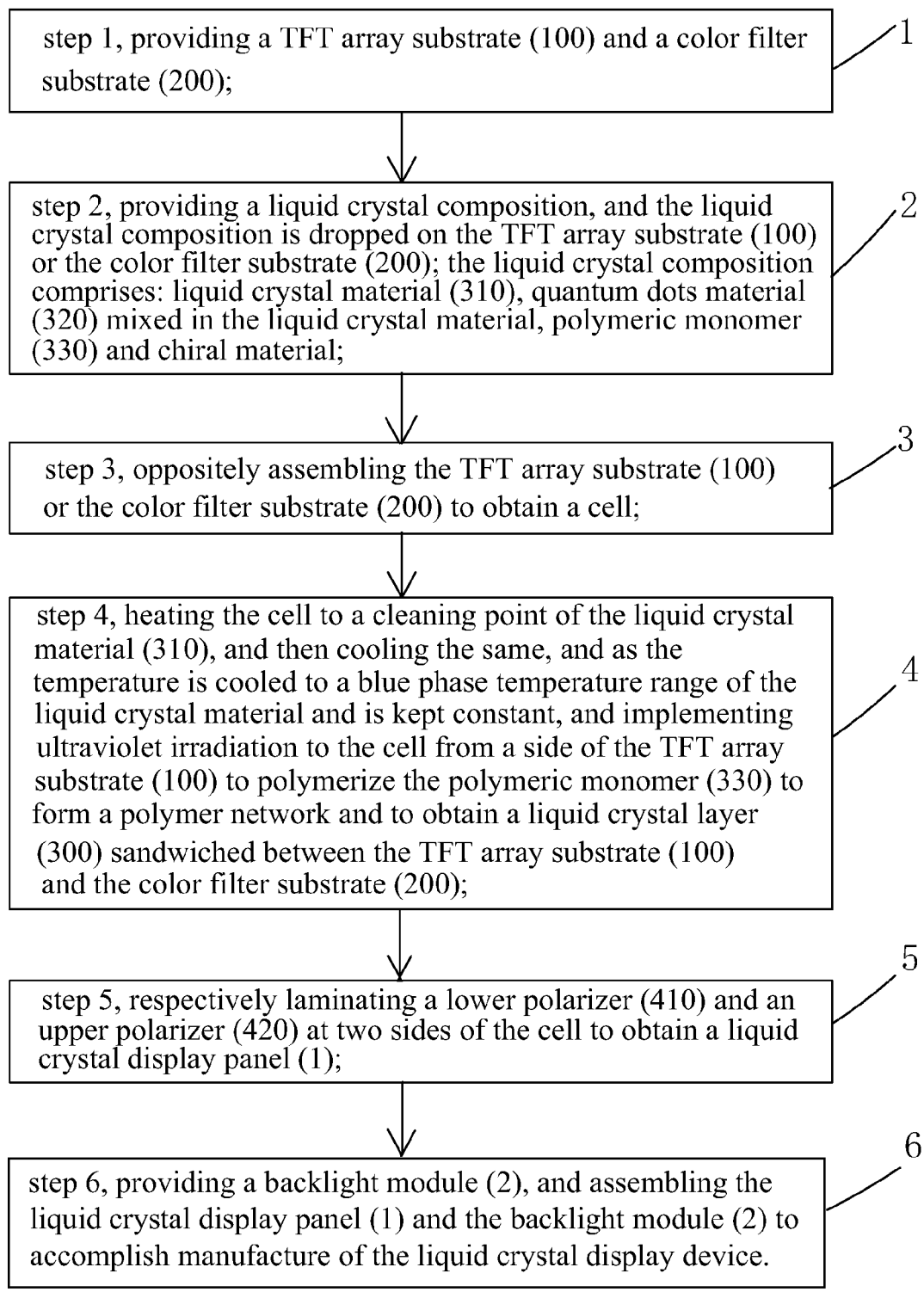
FIG. 2 is a flowchart of a manufacture method of a liquid crystal display device according to the present invention.

Please refer to FIG. 2. The present invention further provides a manufacture method of a liquid crystal display device, comprising steps of:

step 1, providing a TFT array substrate 100 and a color filter substrate 200.

Figure 3:
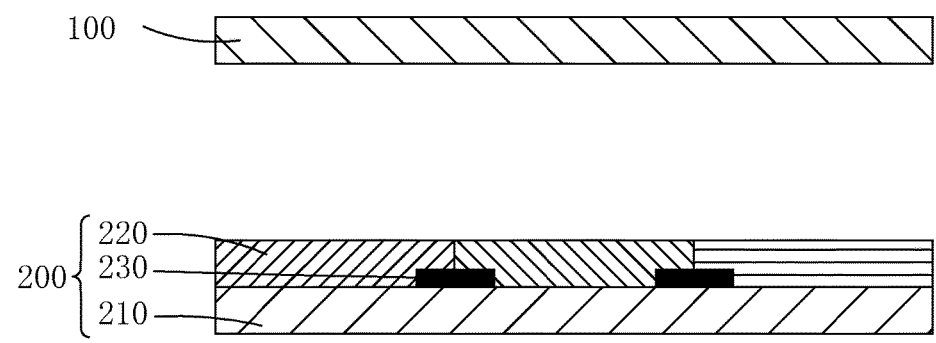
FIG. 3 is a diagram of the step 1 in a manufacture method of a liquid crystal display device according to the present invention.

Please refer to FIG. 3. Specifically, the TFT array substrate 100 comprises: a first substrate, a TFT array located on the first substrate and an electrode layer located on the TFT array; the color filter substrate 200 comprises: a second substrate 210, a black matrix 230 located on the second substrate 210, a color filter layer 220 located on the second substrate 210 and the black matrix 230 and photo spacers located on the color filter layer 220.

step 2, providing a liquid crystal composition, and the liquid crystal composition is dropped on the TFT array substrate 100 or the color filter substrate 200.

The liquid crystal composition comprises: liquid crystal material 310, quantum dots material 320 mixed in the liquid crystal material 310, polymeric monomer 330 and chiral material;

then, the liquid crystal material 310 in the liquid crystal composition is nematic liquid crystal.

Specifically, the liquid crystal material 310 is positive liquid crystal.

Preferably, the molecule structure of the liquid crystal material 310 is one or more of followings:

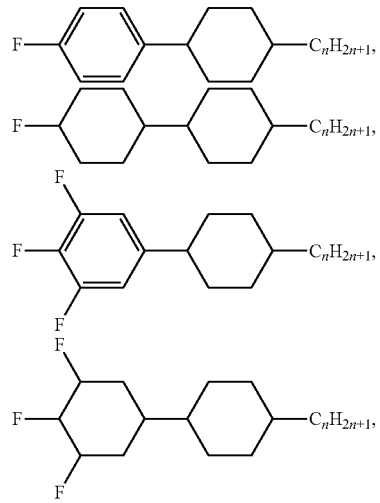

-continued

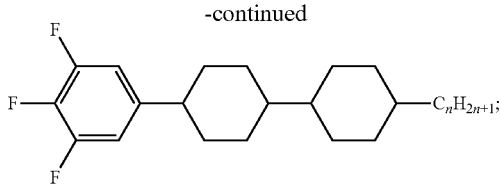

wherein n=3, 4, 5, 6, 7, 8.

Specifically, a mass percentage of the chiral material in the liquid crystal composition is 2 wt %-5 wt %.

Preferably, the molecule structure of the chiral material is

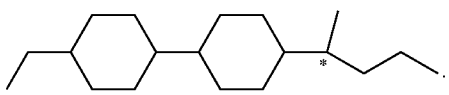

Specifically, the polymeric monomer 330 is ultraviolet polymeric monomer having liquid crystal properties and the end group comprises the double bonds. Such ultraviolet polymeric monomer has the liquid crystal properties itself, and the end group comprises the double bonds, and can be better dissolved into the liquid crystal molecules.

Preferably, the polymeric monomer 330 is 1,4-Di[4-(6'-acryloyloxyhexyloxy)benzoyloxy]-2-methylbenzene, and the molecule structure is:

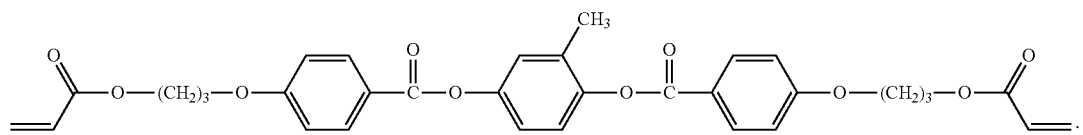

Specifically, a mass percentage of the polymeric monomer 330 in the liquid crystal composition is 0.1 wt %-25 wt %.

Specifically, the quantum dots material 320 in the liquid crystal composition comprises: red photoluminescence quantum dots, green photoluminescence quantum dots and blue photoluminescence quantum dots; a mass percentage of the red photoluminescence quantum dots in the liquid crystal composition is 0.01 wt %-2 wt %; a mass percentage of the green photoluminescence quantum dots in the liquid crystal composition is 0.01 wt % -2 wt % and a mass percentage of the blue photoluminescence quantum dots in the liquid crystal composition is smaller 2 wt %.

Moreover, the quantum dots material 320 in the liquid crystal composition is quantum dots of which surfaces have been modified and provided with ligand molecules. Specifically, the material of the quantum dots is one or more of CdS, CSe, CTe, PbS, PbSe, PbTe, ZnS, ZnSe, ZnTe, HgS, HgSe, HgTe, GaS, GaSe, Gae, InS, InSe and InTe, and comprises a core shell structure formed with the combination of the aforesaid arbitrary materials; the ligand molecules mainly are ligand with the liquid crystal group, and the quantum dots material 320, of which the surface is provided with ligand molecules, is lipophilic so that the quantum dots material 320 can be better dispersed in the blue phase liquid crystal 310. Specifically, the surface modification of the quantum dots material 320 can be microcapsulation, microemulsion, compounding and surfactant active solvent.

Figure 4:
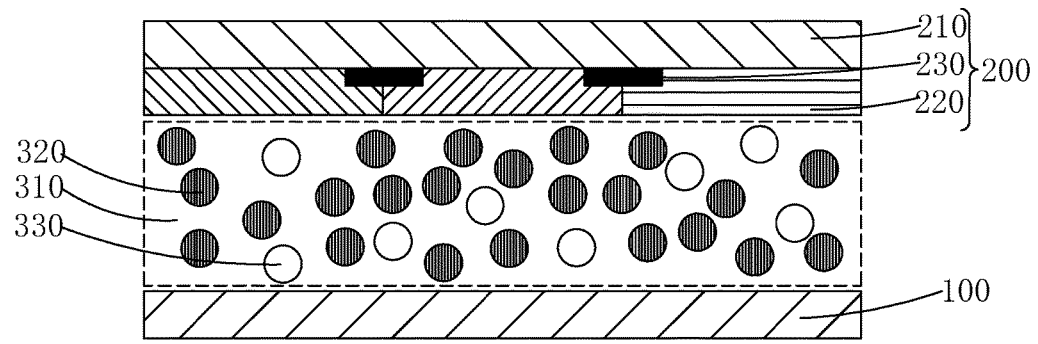
FIG. 4 is a diagram of the step 3 in a manufacture method of a liquid crystal display device according to the present invention.
Figure 5:
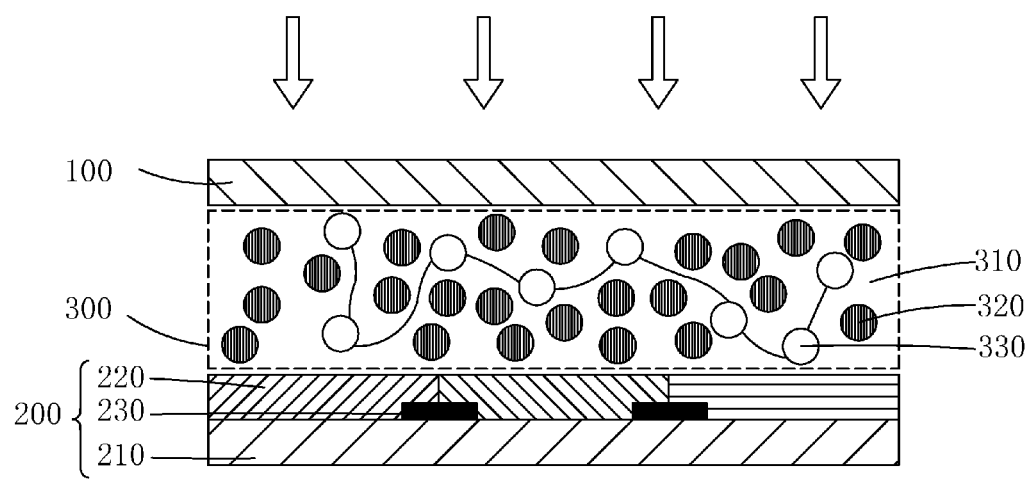
FIG. 5 is a diagram of the step 4 in a manufacture method of a liquid crystal display device according to the present invention.

Specifically, the quantum dots material 320 in the liquid crystal composition is mixture having various particle grain sizes, and grain sizes of the quantum dots of forming the quantum dots material 320 are 1-30 nm.

step 3, as shown in FIG. 4, oppositely assembling the TFT array substrate 100 or the color filter substrate 200 to obtain a cell.

step 4, as shown in FIG. 5, heating the cell to a cleaning point of the liquid crystal material 310, and then cooling the same, and as the temperature is cooled to a blue phase temperature range of the liquid crystal material 310 and is kept constant, and implementing ultraviolet irradiation to the cell from a side of the TFT array substrate 100 to polymerize the polymeric monomer 330 to form a polymer network and to obtain a liquid crystal layer 300 sandwiched between the TFT array substrate 100 and the color filter substrate 200, and then the liquid crystal material 310 in the liquid crystal layer 300 is blue phase liquid crystal.

Significantly, the grain size of the quantum dots material 320 in the liquid crystal composition is in the nano scale, which can expand the blue phase temperature range of the liquid crystal material 310. Namely, the blue phase temperature range of the liquid crystal material 310 has already been expanded before the polymeric monomer 330 in the step 4is polymerized. Thus, the precision requirement of the polymerization of the polymeric monomer 330 in the step 4 in the blue phase temperature range is decreased to reduce the difficulty of the polymerization process.

Figure 6:
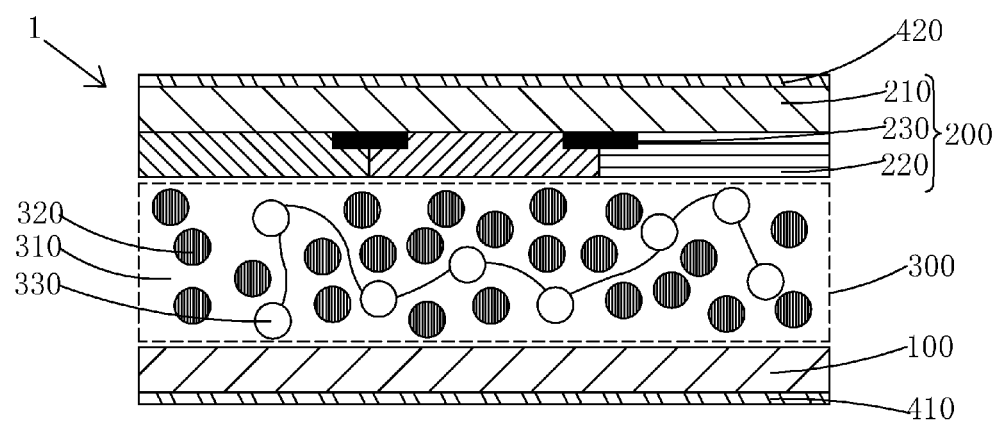
FIG. 6 is a diagram of the step 5 in a manufacture method of a liquid crystal display device according to the present invention.

Specifically, in the step 4, a cooling rate to the cell is 0.01° C./min-2° C./min.

step 5, as shown in FIG. 6, laminating a lower polarizer 410 at one side of the TFT array substrate 100 away from the liquid crystal layer 300, and laminating an upper polarizer 420 at one side of the color filter substrate 200 away from the liquid crystal layer 300 to obtain a liquid crystal display panel 1.

step 6, providing a backlight module 2, and assembling the liquid crystal display panel 1 and the backlight module 2 to accomplish manufacture of the liquid crystal display device.

Specifically, the backlight module 2 is a blue light backlight module which emits the blue light; selectably, the quantum dots material 320 provided in the step 2 cannot include the blue photoluminescence quantum dots, either.

Specifically, the liquid crystal display device made by the manufacture method of the liquid crystal display device is a blue phase liquid crystal display device. Because the response time of the blue phase liquid crystal can be smaller than 1 ms. The response speed of the manufactured liquid crystal display device is promoted. Meanwhile, with the property of the blue phase liquid crystal, the alignment layer process is not required in the manufacture method of the liquid crystal display device, which can reduce the difficulty of the process to reduce the production cost. As the liquid crystal material 310 is in the blue phase temperature range, the polymeric monomer 330 accepts the ultraviolet irradiation and generates polymerization to form a polymer network, and then it can stable the blue phase liquid crystal and expand the blue phase temperature range to reduce the application difficulty of the blue phase liquid crystal. The quantum dots material 320 is nano particle and can expand the blue phase temperature range of the liquid crystal material 310. Namely, the blue phase temperature range of the liquid crystal material 310 has already been expanded before the polymeric monomer 330 is polymerized. The difficulty of the polymerization process is decreased, and meanwhile, it can improve the hysteresis, and realize the zero hysteresis effect. Meanwhile, due to the property of the quantum dots material, the backlight efficiency and the display color gamut of the liquid crystal display device made by the manufacture method of the liquid crystal display device can be raised for promoting the performance of the liquid crystal display device, so that the liquid crystal display device can be applied for the rapid display and 3D display fields.

In conclusion, the liquid crystal display device of the present invention is a blue phase liquid crystal display device. The alignment layer is not required. The liquid crystal composition forming the liquid crystal layer comprises liquid crystal material, quantum dots material mixed in the liquid crystal material, polymeric monomer and chiral material; the polymeric monomer is polymerized to form a polymer network under a blue phase temperature range of the liquid crystal material as forming the liquid crystal layer, which can stabilize the blue phase liquid crystal, and thus to expand the blue phase temperature range of the liquid crystal material. The grain size of the quantum dots material in the liquid crystal composition is in the nano scale, which can expand the blue phase liquid crystal temperature range. Namely, the blue phase temperature range of the liquid crystal material has already been expanded before the polymeric monomer is polymerized. Thus, the temperature precision requirement and the difficulty of the polymerization process is decreased, and the quantum dots material can improve the hysteresis, and meanwhile raise the backlight efficiency and the display color gamut of the liquid crystal display device, and the liquid crystal display device can be applied for the rapid display and 3D display fields. In the manufacture method of the liquid crystal display device, the liquid crystal composition forming the liquid crystal layer comprises liquid crystal material, quantum dots material mixed in the liquid crystal material, polymeric monomer and chiral material, and as the liquid crystal material is in the blue phase temperature range, the ultraviolet irradiation is implemented to the polymeric monomer to polymerize the same to form a polymer network, and thus to form the blue phase liquid crystal display device having wide temperature range, low hysteresis effect. The manufacture of the alignment layer in the liquid crystal display device can be eliminated to reduce the cost to raise the response speed of the liquid crystal display device and to raise the backlight efficiency and the display color gamut of the liquid crystal display device.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A liquid crystal display device, comprising a liquid crystal display panel and a backlight module under the liquid crystal display panel;

wherein the liquid crystal display panel comprises a thin film transistor (TFT) array substrate and a color filter substrate which are oppositely located, and a liquid crystal layer sandwiched between the TFT array substrate and the color filter substrate, a lower polarizer located at one side of the TFT array substrate away from the liquid crystal layer and an upper polarizer located at one side of the color filter substrate away from the liquid crystal layer;

the liquid crystal layer is formed with a liquid crystal composition, which comprises a liquid crystal material, a quantum dots material mixed in the liquid crystal material, a polymeric monomer and a chiral material;

the liquid crystal material in the liquid crystal layer is in a blue phase;

the polymeric monomer is polymerized in the liquid crystal layer in a condition that the liquid crystal material is in the blue phase with the quantum dots material mixed therein to form a polymer network under a blue phase temperature range of the liquid crystal material so as to stabilize the blue phase of the liquid crystal material, wherein the quantum dots material mixed in the liquid crystal material causes expansion of the blue phase temperature range of the liquid crystal material so that polymerization of the polymeric monomer is carried out in an expanded blue phase temperature range.

2. The liquid crystal display device according to claim 1, wherein a mass percentage of the polymeric monomer in the liquid crystal composition is 0.1 wt %-25 wt %.

3. The liquid crystal display device according to claim 1, wherein the quantum dots material in the liquid crystal composition comprises: red photoluminescence quantum dots, green photoluminescence quantum dots and blue photoluminescence quantum dots;

a mass percentage of the red photoluminescence quantum dots in the liquid crystal composition is 0.01 wt %-2 wt %; a mass percentage of the green photoluminescence quantum dots in the liquid crystal composition is 0.01 wt %-2 wt % and a mass percentage of the blue photoluminescence quantum dots in the liquid crystal composition is smaller 2 wt %.

4. The liquid crystal display device according to claim 3, wherein the quantum dots material in the liquid crystal composition comprises quantum dots having surfaces that are modified and provided with ligand molecules, and a material of the quantum dots comprises one or more of CdS, CSe, CTe, PbS, PbSe, PbTe, ZnS, ZnSe, ZnTe, HgS, HgSe, HgTe, GaS, GaSe, Gae, InS, InSe and InTe, and sizes of the quantum dots are 1-30 nm.

5. The liquid crystal display device according to claim 1, wherein the TFT array substrate comprises: a first substrate, a TFT array located on the first substrate and an electrode layer located on the TFT array;

the color filter substrate comprises: a second substrate, a black matrix located on the second substrate, a color filter layer located on the second substrate and the black matrix and photo spacers located on the color filter layer;

the backlight module is a blue light backlight module.

6. A manufacture method of a liquid crystal display device, comprising steps of:

step 1, providing a thin film transistor (TFT) array substrate and a color filter substrate;

step 2, providing a liquid crystal composition, and dropping the liquid crystal composition on the TFT array substrate or the color filter substrate;

wherein the liquid crystal composition comprises a liquid crystal material, a quantum dots material mixed in the liquid crystal material, a polymeric monomer and a chiral material; and the liquid crystal material in the liquid crystal composition is in a nematic-phase;

step 3, oppositely assembling the TFT array substrate and the color filter substrate to obtain a cell;

step 4, heating the cell to a cleaning point of the liquid crystal material, followed by cooling, so as to bring a temperature down into a blue phase temperature range of the liquid crystal material and to keep the temperature constant in the blue phase temperature range, and implementing ultraviolet irradiation to the cell from a side of the TFT array substrate to polymerize the polymeric monomer to form a polymer network and to obtain a liquid crystal layer sandwiched between the TFT array substrate and the color filter substrate, wherein the liquid crystal material in the liquid crystal layer is changed to a blue phase, and the polymeric monomer is polymerized in the liquid crystal layer in a condition that the liquid crystal material is in the blue phase with the quantum dots material mixed therein to form the polymer network under the blue phase temperature range of the liquid crystal material so as to stabilize the blue phase of the liquid crystal material, wherein the quantum dots material mixed in the liquid crystal material causes expansion of the blue phase temperature range of the liquid crystal material so that polymerization of the polymeric monomer is carried out in an expanded blue phase temperature range;

step 5, laminating a lower polarizer at one side of the TFT array substrate away from the liquid crystal layer, and laminating an upper polarizer at one side of the color filter substrate away from the liquid crystal layer to obtain a liquid crystal display panel;

step 6, providing a backlight module, and assembling the liquid crystal display panel and the backlight module to accomplish manufacture of the liquid crystal display device.

7. The manufacture method of the liquid crystal display device according to claim 6, wherein the quantum dots material in the liquid crystal composition provided in the step 2 comprises: red photoluminescence quantum dots, green photoluminescence quantum dots and blue photoluminescence quantum dots;

a mass percentage of the red photoluminescence quantum dots in the liquid crystal composition is 0.01 wt %-2 wt %; a mass percentage of the green photoluminescence quantum dots in the liquid crystal composition is 0.01 wt %-2 wt % and a mass percentage of the blue photoluminescence quantum dots in the liquid crystal composition is smaller 2 wt %;

the quantum dots material in the liquid crystal composition comprises quantum dots having surfaces that are modified and provided with ligand molecules, and a material of the quantum dots comprises one or more of CdS, CSe, CTe, PbS, PbSe, PbTe, ZnS, ZnSe, ZnTe, HgS, HgSe, HgTe, GaS, GaSe, Gae, InS, InSe and InTe, and sizes of the quantum dots are 1-30 nm.

8. The manufacture method of the liquid crystal display device according to claim 6, wherein a mass percentage of the polymeric monomer in the liquid crystal composition provided in the step 2 is 0.1 wt %-25 wt %.

9. The manufacture method of the liquid crystal display device according to claim 6, wherein in the step 4, a cooling rate of the cell is 0.01° C./min-2° C./min.

10. The manufacture method of the liquid crystal display device according to claim 6, wherein the TFT array substrate comprises: a first substrate, a TFT array located on the first substrate and an electrode layer located on the TFT array;

the color filter substrate comprises: a second substrate, a black matrix located on the second substrate, a color filter layer located on the second substrate and the black matrix and photo spacers located on the color filter layer;

the backlight module is a blue light backlight module.

11. A liquid crystal display device, comprising a liquid crystal display panel and a backlight module under the liquid crystal display panel;

wherein the liquid crystal display panel comprises a thin film transistor (TFT) array substrate and a color filter substrate which are oppositely located, and a liquid crystal layer sandwiched between the TFT array substrate and the color filter substrate, a lower polarizer located at one side of the TFT array substrate away from the liquid crystal layer and an upper polarizer located at one side of the color filter substrate away from the liquid crystal layer;

the liquid crystal layer is formed with a liquid crystal composition, which comprises a liquid crystal material, a quantum dots material mixed in the liquid crystal material, a polymeric monomer and a chiral material;

the liquid crystal material in the liquid crystal layer is in a blue phase;

the polymeric monomer is polymerized in the liquid crystal layer in a condition that the liquid crystal material is in the blue phase with the quantum dots material mixed therein to form a polymer network under a blue phase temperature range of the liquid crystal material so as to stabilize the blue phase of the liquid crystal material, wherein the quantum dots material mixed in the liquid crystal material causes expansion of the blue phase temperature range of the liquid crystal material so that polymerization of the polymeric monomer is carried out in an expanded blue phase temperature range;

wherein a mass percentage of the polymeric monomer in the liquid crystal composition is 0.1 wt %-25 wt %; and wherein the quantum dots material in the liquid crystal composition comprises: red photoluminescence quantum dots, green photoluminescence quantum dots and blue photoluminescence quantum dots;

a mass percentage of the red photoluminescence quantum dots in the liquid crystal composition is 0.01 wt %-2 wt %; a mass percentage of the green photoluminescence quantum dots in the liquid crystal composition is 0.01 wt %-2 wt % and a mass percentage of the blue photoluminescence quantum dots in the liquid crystal composition is smaller 2 wt %.

12. The liquid crystal display device according to claim 11, wherein the quantum dots material in the liquid crystal composition comprises quantum dots having surfaces that are modified and provided with ligand molecules, and a material of the quantum dots comprises one or more of CdS, CSe, CTe, PbS, PbSe, PbTe, ZnS, ZnSe, ZnTe, HgS, HgSe, HgTe, GaS, GaSe, Gae, InS, InSe and InTe, and sizes of the quantum dots are 1-30 nm.

13. The liquid crystal display device according to claim 11, wherein the TFT array substrate comprises: a first substrate, a TFT array located on the first substrate and an electrode layer located on the TFT array;

the color filter substrate comprises: a second substrate, a black matrix located on the second substrate, a color filter layer located on the second substrate and the black matrix and photo spacers located on the color filter layer;

the backlight module is a blue light backlight module.

* * * * *